Jan. 3, 1939.   G. A. JOHNSON ET AL   2,142,247
FRICTION SHOCK ABSORBING MECHANISM
Filed May 1, 1936   2 Sheets-Sheet 2
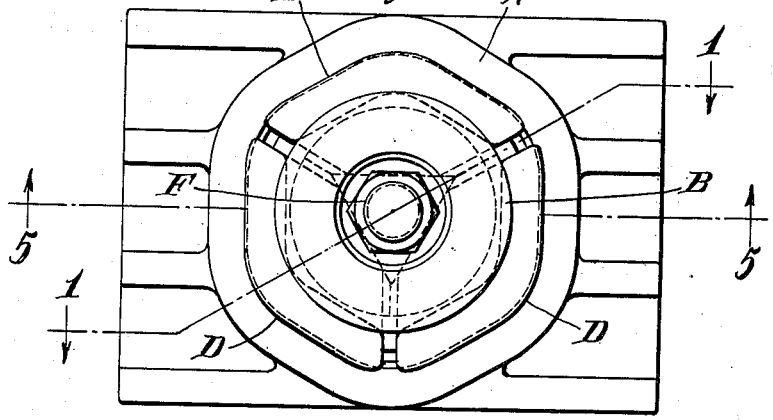
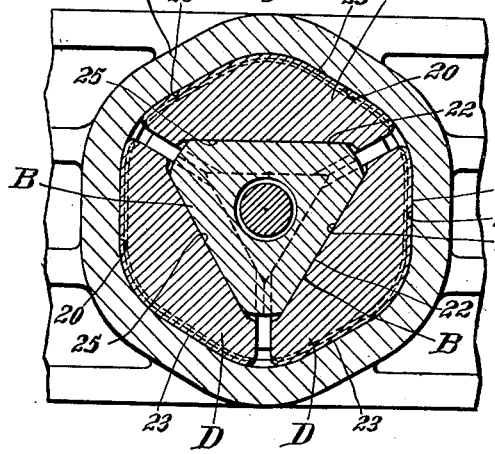
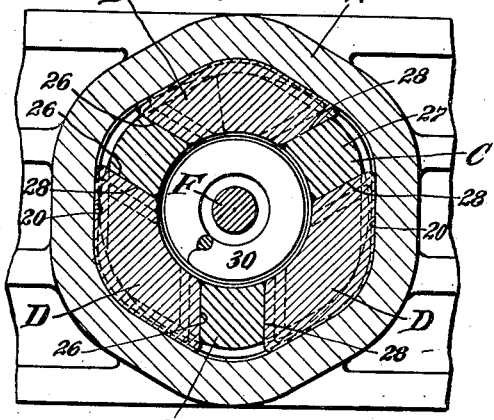
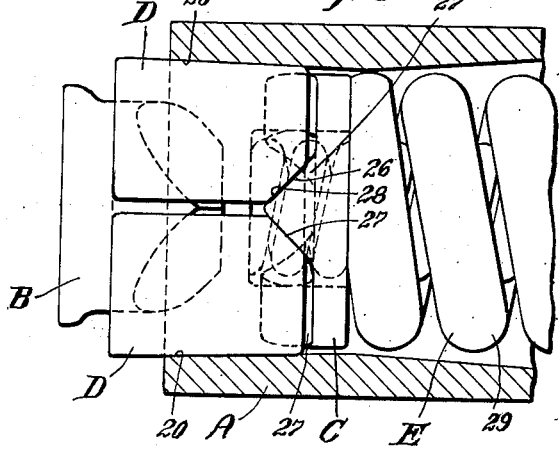
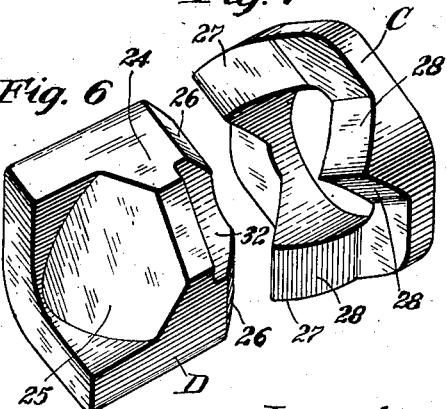
Inventors
George A. Johnson
Stacy B. Haseltine
By Henry Fuchs
Atty.

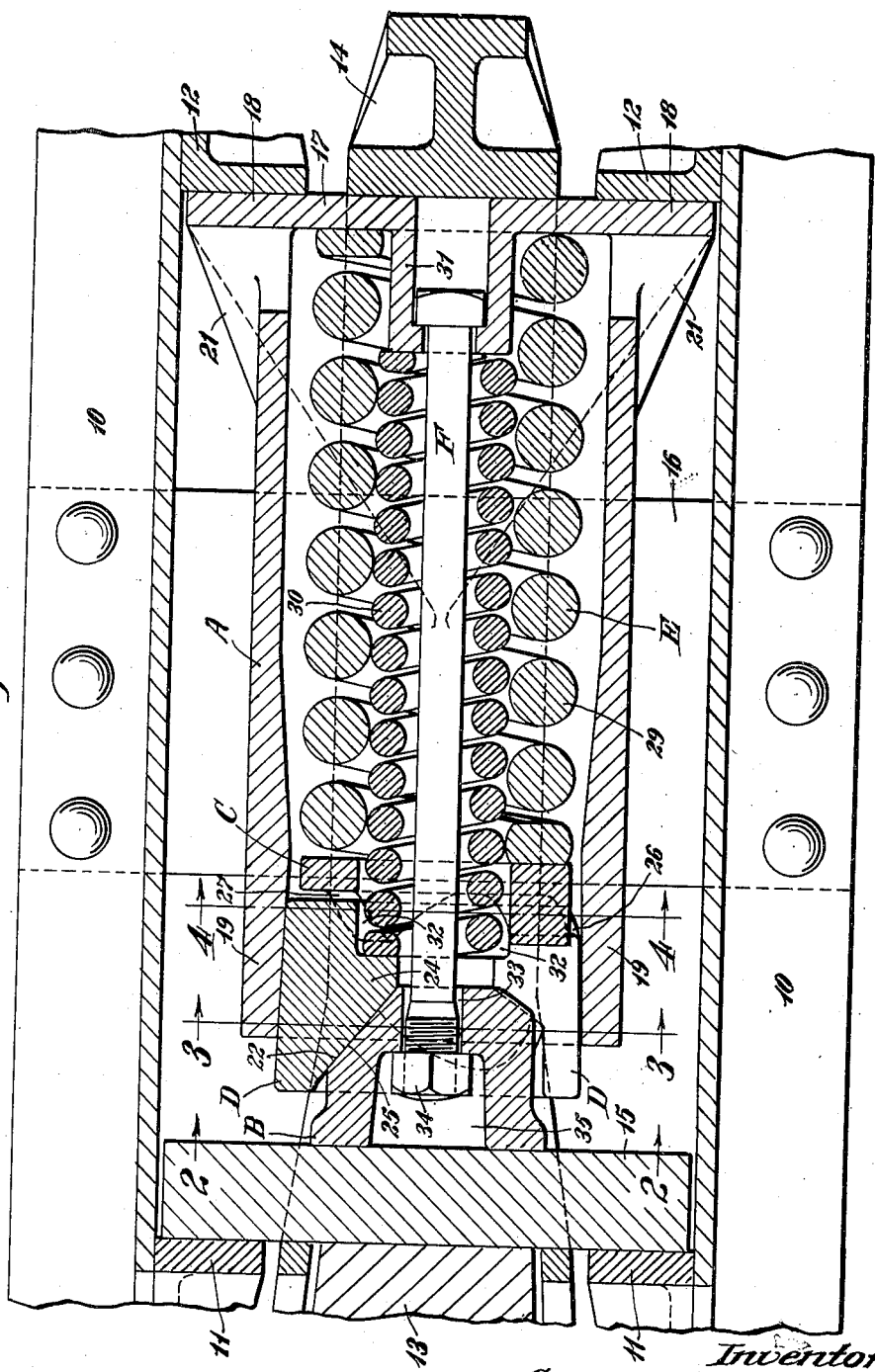

Patented Jan. 3, 1939

2,142,247

UNITED STATES PATENT OFFICE 2,142,247

FRICTION SHOCK ABSORBING MECHANISM

George A. Johnson, Chicago, and Stacy B. Haseltine, Glen Ellyn, Ill., assignors to W. H. Miner, Inc., Chicago, Ill., a corporation of Delaware Application May 1, 1936, Serial No. 77,318

10 Claims. (Cl. 213—32)

This invention relates to improvements in friction shock absorbing mechanisms.

One object of the invention is to provide an efficient friction shock absorbing mechanism of high capacity, especially adapted for railway draft riggings, comprising a friction casing and cooperating friction shoes, wherein the high capacity is obtained by spreading the shoes apart both radially and circumferentially to force the same into intimate contact with the cooperating friction surfaces of the casing.

A more specific object of the invention is to provide a friction shock absorbing mechanism including a casing having interior friction surfaces, and a spring resisted friction system or friction clutch cooperating with the friction casing, wherein high capacity is obtained by forcing the friction elements of the clutch into intimate frictional contact with the casing friction surfaces by separately acting wedge means, one of which directly receives the actuating force and wedges the friction elements laterally outwardly with respect to the longitudinal axis of the mechanism, and the other of which is yieldingly maintained in wedging engagement with the friction elements to spread adjacent of said elements apart laterally, thereby producing high frictional capacity without sacrificing easy releasing action of the mechanism.

Other objects of the invention will more clearly appear from the description and claims hereinafter following.

In the drawings forming a part of this specification, Figure 1 is a horizontal sectional view through the underframe of a railway car, illustrating our improved friction shock absorbing mechanism in connection therewith, the section through said mechanism corresponding to the line 1—1 of Figure 2. Figure 2 is a front elevational view of the friction shock absorbing mechanism illustrated in Figure 1, looking in the direction of the arrows 2—2 in Figure 1. Figures 3 and 4 are transverse, vertical, sectional views, corresponding substantially to the lines 3—3 and 4—4 of Figure 1, the underframe structure of the car and the draft yoke being omitted. Figure 5 is a broken, horizontal, sectional view of the front end portion of the friction casing showing the parts contained therein in elevation, said view corresponding substantially to the section line 5—5 of Figure 2 and looking upwardly as indicated by the arrows in said figure. Figures 6 and 7 are detailed, perspective views, respectively, of a friction shoe and a cooperating wedge ring employed in the improved mechanism.

In said drawings, 10—10 indicate channel-shaped center or draft sills of a railway car underframe structure, to the inner sides of which are secured front and rear stop lugs 11—11 and 12—12. The inner end of the usual coupler shank is indicated by 13 and a hooded yoke 14 of well-known form is operatively connected to said shank. The improved shock absorbing mechanism proper and a front main follower 15 are disposed within the yoke 14 and the yoke is supported by a saddle plate 16 secured to the bottom flanges of the draft sills 10—10.

Our improved friction shock absorbing mechanism proper comprises broadly a friction casing A; a wedge block B; a wedge ring C; three friction shoes D—D—D; a spring resistance E; and a retainer bolt F.

The friction casing A is in the form of a shell of hexagonal cross section, open at the front end and closed by a vertical transverse wall 17 at the rear end. The wall 17 is extended laterally outwardly beyond the sides of the casing A, thereby presenting flanges 18—18 which cooperate with the rear stop lugs 12—12 in the manner of the usual rear follower. At the forward end of the casing A, the walls thereof are thickened, as indicated at 19. The casing is provided with interior flat friction surfaces 20—20 formed on the inner sides of said thickened wall portions 19—19. The casing thus presents six interior friction surfaces which are arranged symmetrically above the central longitudinal axis of the casing. As shown in Figure 1, these friction surfaces are preferably converged inwardly of the casing, thereby providing a tapered friction shell section. The flanges 18—18 at the rear end of the casing A are preferably reenforced by webs 21—21 formed integral with said flanges and the side walls of the casing.

The wedge B is in the form of a block having a transverse front end face bearing on the inner side of the follower 15. The block is provided at its inner end with three inwardly converging, flat wedge faces 22—22—22 arranged symmetrically about the longitudinal axis of the mechanism.

The friction shoes are three in number and are disposed symmetrically about the longitudinal axis of the mechanism. Each shoe D is provided with an outer friction surface 23 of substantially V-shaped cross section engaging with two adjacent friction surfaces 20—20 of the casing A and correspondingly inclined to said friction surfaces 20—20. The three shoes D—D—D are circumferentially spaced with respect to each other, as clearly shown in Figures 2, 3, 4, and 5. Each shoe D is provided with an inward enlargement 24 having a forwardly facing wedge face 25 thereon, engaged by one of the wedge faces 22 of the block B and correspondingly inclined thereto. At the rear end each shoe D has a pair of oppositely inclined, flat wedge faces 26—26 which cooperate with the wedge ring C, as hereinafter more fully pointed out. The wedge faces 26—26 are located at opposite sides of the shoe D, as most clearly shown in Figure 6, and face laterally outwardly with respect to said shoe. As will be seen upon reference to Figures 4 and 5, the wedge faces 26—26 of adjacent shoes are thus opposed to each other and are inclined in opposite directions.

The wedge member C is in the form of an annulus or ring having three forwardly extending wedge projections 27—27—27 thereon. Each wedge projection 27 is engaged between two adjacent shoes D—D and has forwardly converging, flat wedge faces 28—28 thereon engaging the opposed wedge faces 26—26 at the inner ends of said adjacent shoes and correspondingly inclined to said faces 26—26. The wedge ring C also functions as a spring follower as is hereinafter more fully described.

The spring resistance E, which comprises a heavy outer coil 29 and a relatively lighter inner coil 30, is arranged within the casing A and yieldingly opposes movement of the friction clutch means comprising the wedge B, shoes D—D—D, and wedge ring C inwardly of the casing. The outer coil spring 29 is interposed between the wedge ring C and the rear end wall of the casing and has its opposite ends bearing respectively on said members. The rear end of the coil spring 29 is held centered by an inwardly projecting, hollow boss 31 on the rear wall 18 of the casing. This boss extends into the rear end portion of the spring. The inner coil spring 30 directly opposes movement of the shoes D—D—D and is interposed between the latter and the rear wall of the casing A. The spring 30 has its rear end bearing on the hollow boss 31. The front end portion of this spring extends freely through the opening of the ring C and has its front extremity bearing in a seat provided by pockets 32—32—32 formed in the shoes D—D—D.

The retainer bolt F is anchored at its rear end to the boss 31 and has the shank thereof extending through the coil spring 30 and an opening 33 in the wedge block B. The wedge block B is anchored to the bolt F, the bolt being provided with a nut 34 at its forward end seated in a pocket 35 of the wedge block and having shouldered engagement with the block to limit outward movement of the latter. The bolt F serves to hold the mechanism assembled and maintain uniform overall length thereof. The mechanism is preferably so adjusted that the bolt holds the parts under a predetermined initial compression.

The operation of our improved friction shock absorbing mechanism is as follows: During a draft action of the rigging, the yoke 14 is pulled outwardly by the coupler 13 of the car, thereby pulling the casing A of the shock absorbing mechanism outwardly therewith and compressing the shock absorbing mechanism against the front follower 15 which, at this time, is held stationary by the fixed front stop lugs 11—11. The wedge B is thus forced to move inwardly of the casing A. During a buffing action, the coupler 13 is moved inwardly, carrying the front follower 15 rearwardly therewith and compressing the friction shock absorbing mechanism against the rear stop lugs 12—12, the friction casing A being held stationary at this time by engagement of the flanges 18—18 thereof with the rear stop lugs 12—12. Inward movement of the wedge B during compression of the mechanism in either draft or buff sets up a wedging action between the wedge B and the shoes D—D—D and carries the latter inwardly of the casing while pressing the same into active wedging engagement with the wedge projections of the ring C, inward movement of the shoes and the ring C being resisted by the springs 29 and 30 of the spring resistance E. Due to the wedging action produced between the wedge B and the shoes D—D—D, the latter are pressed laterally outwardly against the friction surfaces of the casing. At the same time, the yieldingly resisted wedge ring C exerts a spreading action between adjacent shoes, thereby exerting force to spread the shoes apart circumferentially. Due to the simultaneous action of the wedges B and C on the inner sides and the side edges of the shoes, the pressure on said shoes is distributed in such a manner that true surface contact throughout the entire active friction surface portions of the shoes and casing is assured. Relatively high frictional resistance is thus produced between the friction surfaces of the shoes and casing. This frictional resistance is augmented due to the taper of the friction shell section of the casing. The compression of the mechanism is limited by engagement of the follower 15 with the front end portion of the casing A, the casing acting as a solid column load transmitting member to prevent undue compression of the spring resistance E.

Upon reduction of the actuating force, the pressure on the wedge is relieved, thereby permitting release of the latter from active wedging engagement with the shoes and permitting outward movement of the shoes due to the expansive action of the springs 29 and 30, the spring 30 acting directly on the shoes to force the same outwardly, and the spring 29 acting on the shoes through the wedge ring C. Inasmuch as the spring 30 acts directly on the shoes, it tends to force the shoes outwardly with respect to the wedge ring, thereby facilitating release between the cooperating wedge faces of the shoes and wedge ring C. Restoration of the parts to normal fully released position is thus effected, outward movement of the wedge being finally limited by the retainer bolt F.

We have herein shown and described what we now consider the preferred manner of carrying out our invention, but the same is merely illustrative and we contemplate all changes and modifications that come within the scope of the claims appended hereto.

We claim:

1. In a friction shock absorbing mechanism, the combination with a casing having interior friction surfaces; of a plurality of friction shoes having sliding frictional engagement with the friction surfaces of the casing; a wedge block engaging said shoes and wedging the same radially outwardly only; additional wedge means engaging between adjacent shoes and exerting pressure on the side edges thereof to spread the same apart circumferentially; and means yieldingly opposing inward movement of said wedge means and shoes.

2. In a friction shock absorbing mechanism, the combination with a casing having interior friction surfaces; of a plurality of friction shoes disposed symmetrically about the longitudinal axis of the mechanism; a wedge pressure transmitting block disposed centrally between said shoes and having wedging engagement with the inner sides of said shoes on cooperating faces converging rearwardly and inwardly toward said axis; a second wedge member having wedge means thereon engaging between adjacent shoes to force the same laterally apart; and spring means opposing inward movement of said shoes and second named wedge member.

3. In a friction shock absorbing mechanism, the combination with a casing having interior friction surfaces; of a plurality of friction shoes having friction surfaces on their outer sides engaging the casing surfaces, and wedge faces on their inner sides facing the central longitudinal axis of the mechanism; a wedge pressure transmitting block having wedging engagement with said wedge faces of the shoes; means yieldingly opposing inward movement of the shoes; a wedge member having projecting portions having wedging engagement between adjacent shoes to wedge the same laterally apart; and additional yielding means opposing inward movement of said second wedge member.

4. In a friction shock absorbing mechanism, the combination with a casing having interior friction surfaces; of a plurality of friction shoes having sliding frictional engagement with the friction surfaces of the casing; wedge means at the outer and inner ends of said shoes, said outer wedge means receiving the actuating force; and means yieldingly opposing inward movement of said inner wedge means, one of said wedge means having wedging engagement with said shoes to exert wedging pressure in a direction laterally outwardly away from the longitudinal axis of the mechanism, and the other of said wedge means having wedging engagement between adjacent shoes and with the lateral edge portions of said shoes.

5. In a friction shock absorbing mechanism, the combination with a casing having interior friction surfaces; of a plurality of friction shoes having outer friction surfaces in sliding engagement with said casing friction surfaces, each shoe having a wedge face on the inner side thereof inclined outwardly and away from the longitudinal axis of the mechanism; a wedge pressure transmitting block having wedging engagement with the wedge faces of said shoes; an inner wedge having wedge means thereon engaging between adjacent shoes and with the side edge portions thereof at the inner ends of said shoes for spreading the shoes apart circumferentially; and means yieldingly opposing inward movement of said inner wedge.

6. In a friction shock absorbing mechanism, the combination with a casing having interior friction surfaces; of a plurality of friction shoes having friction surfaces on their outer sides slidingly engaging said casing friction surfaces, each shoe having a wedge face on the inner side thereof inclined outwardly and away from the longitudinal axis of the mechanism, each shoe also having a pair of oppositely inclined side edge wedge faces at the inner end thereof; an outer wedge member in wedging engagement with the wedge faces on the inner sides of said shoes; an inner wedge member having a plurality of wedge projections extending between adjacent of said shoes and engaging the side wedge faces thereof; and spring means opposing movement of said inner wedge inwardly of the casing.

7. In a friction shock absorbing mechanism, the combination with a casing having interior friction surfaces; of a plurality of friction shoes having friction surfaces on their outer sides slidingly engaging said casing friction surfaces, each shoe having a wedge face on the inner side thereof inclined outwardly and away from the longitudinal axis of the mechanism, each shoe also having a pair of oppositely inclined side edge wedge faces at the inner end thereof; an outer wedge member in wedging engagement with the wedge faces on the inner sides of said shoes; an inner wedge member having a plurality of wedge projections extending between adjacent of said shoes and engaging the side wedge faces thereof; spring means opposing movement of said inner wedge inwardly of the casing; and additional spring means directly engaging said shoes and opposing inward movement thereof only.

8. In a friction shock absorbing mechanism, the combination with a casing of angular cross section having a plurality of longitudinally extending interior friction surfaces, adjacent surfaces being disposed at an angle to each other; of a plurality of V-shaped friction shoes, each shoe having sliding frictional engagement with adjacent surfaces of the casing; means yieldingly opposing inward movement of said shoes; a central wedge pressure transmitting member having laterally outwardly acting wedge faces in wedging engagement with said shoes; and a second wedge member having wedge projections engaging between adjacent shoes to wedge the same laterally apart.

9. In a friction shock absorbing mechanism, the combination with a casing having longitudinally extending interior friction surfaces of V-shaped cross section; of a plurality of friction shoes, each shoe having a friction surface on the outer side thereof of V-shaped cross section cooperating with one of said V-shaped surfaces of the casing, each shoe having a forwardly facing wedge face on the inner side thereof inclined outwardly and away from the longitudinal axis of the mechanism, each shoe also having a pair of rearwardly facing wedge faces at opposite side edge portions thereof inclined in opposite directions, said last named faces of adjacent shoes being opposed and facing each other; a central outer wedge member having wedging engagement with said forwardly facing wedge faces of the shoes; an inner wedge member having wedge portions projecting between adjacent shoes and in wedging engagement with said opposed rearwardly facing wedge faces of said adjacent shoes; and means yieldingly opposing inward movement of said inner wedge member and shoes.

10. In a friction shock absorbing mechanism, the combination with a casing of hexagonal cross section presenting three V-shaped interior friction surfaces; of three friction shoes, each shoe having an outer friction surface of V-shaped cross section in sliding engagement with one of the V-shaped friction surfaces of the casing, each shoe having a forwardly facing wedge face on the inner side thereof inclined outwardly away from the central longitudinal axis of the mechanism; a central wedge engaging said wedge faces of the shoes; a spring resistance; and an inner wedge forced into engagement with said shoes by said spring resistance, said inner wedge having three wedge projections thereon, each projection engaging between adjacent shoes to spread the same apart circumferentially.

GEORGE A. JOHNSON.
STACY B. HASELTINE.